US007916979B2

(12) United States Patent
Simmons

(10) Patent No.: US 7,916,979 B2
(45) Date of Patent: *Mar. 29, 2011

(54) METHOD AND SYSTEM FOR DISPLAYING AND LINKING INK OBJECTS WITH RECOGNIZED TEXT AND OBJECTS

(75) Inventor: Alex J. Simmons, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1004 days.

This patent is subject to a terminal disclaimer.

(21) Appl. No.: 11/455,056

(22) Filed: Jun. 15, 2006

(65) Prior Publication Data

US 2006/0233464 A1    Oct. 19, 2006

Related U.S. Application Data

(63) Continuation of application No. 10/186,463, filed on Jun. 28, 2002, now Pat. No. 7,079,713.

(51) Int. Cl.
*G06K 7/10* (2006.01)
(52) U.S. Cl. .................................... 382/321; 382/187
(58) Field of Classification Search .............. 382/321, 382/119, 175, 176, 187–189, 202–203, 229–231, 382/291–292, 309, 311; 345/173, 179; 715/810, 715/521, 854, 856; 707/541; 710/14
See application file for complete search history.

(56) References Cited

U.S. PATENT DOCUMENTS

| | | | |
|---|---|---|---|
| 2,354,332 A | 7/1944 | Polydoroff | 343/788 |
| 5,063,376 A | 11/1991 | Chang | 345/163 |
| 5,063,600 A | 11/1991 | Norwood | 345/173 |
| 5,133,076 A | 7/1992 | Hawkins et al. | 708/141 |
| 5,231,698 A | 7/1993 | Forcier | 715/541 |
| 5,321,768 A | 6/1994 | Fenrich et al. | 382/178 |
| 5,327,342 A | 7/1994 | Roy | 345/467 |
| 5,339,391 A | 8/1994 | Wroblewski et al. | 345/607 |
| 5,347,295 A | 9/1994 | Agulnick et al. | 345/156 |
| 5,367,453 A | 11/1994 | Capps et al. | 715/531 |

(Continued)

FOREIGN PATENT DOCUMENTS

DE    40 26 852 A1    2/1991

(Continued)

OTHER PUBLICATIONS

U.S. Official Action mailed Nov. 19, 2008, in U.S. Appl. No. 10/804,616.

(Continued)

*Primary Examiner* — Duy M Dang
(74) *Attorney, Agent, or Firm* — Merchant & Gould

(57) ABSTRACT

A user interface can display electronic ink in one section of a display device and corresponding recognized or converted text in another section of the display device that was generated from a electronic ink recognition system. Each page of electronic ink and each corresponding page of converted or recognized text are linked to one another. In other words, each page of electronic ink can be displayed only with its corresponding page of converted or recognized text until a command or message is received that editing of the converted or recognized text has been completed. Once the command or message is received that editing of the converted or recognized text has been completed, then the link between an electronic ink page and its corresponding converted text page is broken. This means that the converted text page can now be saved independently of its corresponding electronic ink page.

21 Claims, 12 Drawing Sheets

U.S. PATENT DOCUMENTS

| | | | | |
|---|---|---|---|---|
| 5,390,281 | A | 2/1995 | Luciw et al. | 395/12 |
| 5,404,442 | A | 4/1995 | Foster et al. | 395/159 |
| 5,434,929 | A | 7/1995 | Beernink et al. | 382/187 |
| 5,442,742 | A | 8/1995 | Greyson et al. | 715/539 |
| 5,446,882 | A | 8/1995 | Capps et al. | 707/104.1 |
| 5,465,325 | A | 11/1995 | Capps et al. | 345/441 |
| 5,477,447 | A | 12/1995 | Luciw et al. | 704/9 |
| 5,479,596 | A | 12/1995 | Capps et al. | 715/539 |
| 5,491,495 | A | 2/1996 | Ward et al. | 345/173 |
| 5,500,937 | A | 3/1996 | Thompson-Rohrlich | 715/764 |
| 5,513,309 | A | 4/1996 | Meier et al. | 715/860 |
| 5,517,578 | A | 5/1996 | Altman et al. | 382/181 |
| 5,523,775 | A | 6/1996 | Capps | 345/179 |
| 5,528,743 | A | 6/1996 | Tou et al. | 715/541 |
| 5,544,295 | A | 8/1996 | Capps | 345/473 |
| 5,544,358 | A | 8/1996 | Capps et al. | 715/523 |
| 5,555,363 | A | 9/1996 | Tou et al. | 715/541 |
| 5,559,942 | A | 9/1996 | Gough et al. | 715/802 |
| 5,561,446 | A | 10/1996 | Montlick | 345/173 |
| 5,579,467 | A | 11/1996 | Capps | 715/507 |
| 5,583,542 | A | 12/1996 | Capps et al. | 345/173 |
| 5,588,105 | A | 12/1996 | Foster et al. | 715/779 |
| 5,590,257 | A | 12/1996 | Forcier | 715/530 |
| 5,592,566 | A | 1/1997 | Pagallo et al. | 382/187 |
| 5,594,640 | A | 1/1997 | Capps et al. | 715/532 |
| 5,596,350 | A | 1/1997 | Capps et al. | 345/173 |
| 5,596,694 | A | 1/1997 | Capps | 345/473 |
| 5,596,697 | A | 1/1997 | Foster et al. | 715/810 |
| 5,602,570 | A | 2/1997 | Capps et al. | 345/173 |
| 5,613,019 | A | 3/1997 | Altman et al. | 382/311 |
| 5,634,102 | A | 5/1997 | Capps | 715/744 |
| 5,649,133 | A | 7/1997 | Arquie | 715/764 |
| 5,655,136 | A | 8/1997 | Morgan | 382/187 |
| 5,666,139 | A | 9/1997 | Thielens et al. | 345/173 |
| 5,666,552 | A | 9/1997 | Greyson et al. | 715/539 |
| 5,671,438 | A | 9/1997 | Capps et al. | 715/539 |
| 5,682,439 | A | 10/1997 | Beernink et al. | 382/187 |
| 5,710,831 | A | 1/1998 | Beernink et al. | 382/189 |
| 5,745,716 | A | 4/1998 | Tchao et al. | 715/777 |
| 5,757,383 | A | 5/1998 | Lipton | 345/442 |
| 5,760,773 | A | 6/1998 | Berman et al. | 715/808 |
| 5,764,818 | A | 6/1998 | Capps et al. | 382/317 |
| 5,768,418 | A | 6/1998 | Berman et al. | 382/187 |
| 5,778,404 | A | 7/1998 | Capps et al. | 715/531 |
| 5,796,397 | A | 8/1998 | Kusano | 715/804 |
| 5,809,498 | A | 9/1998 | Lopresti et al. | 707/6 |
| 5,838,326 | A | 11/1998 | Card et al. | 715/775 |
| 5,838,819 | A | 11/1998 | Ruedisueli et al. | 382/187 |
| 5,864,635 | A | 1/1999 | Zetts et al. | 382/187 |
| 5,867,150 | A | 2/1999 | Bricklin | 345/173 |
| 5,874,957 | A | 2/1999 | Cline et al. | 715/786 |
| 5,880,743 | A | 3/1999 | Moran et al. | 345/473 |
| 5,911,145 | A | 6/1999 | Arora et al. | 715/514 |
| 5,953,735 | A | 9/1999 | Forcier | 715/541 |
| 5,963,208 | A | 10/1999 | Dolan et al. | 715/760 |
| 5,970,455 | A | 10/1999 | Wilcox et al. | 704/270 |
| 6,020,895 | A | 2/2000 | Azami | 345/619 |
| 6,021,218 | A | 2/2000 | Capps et al. | 382/187 |
| 6,035,324 | A | 3/2000 | Chang et al. | 709/203 |
| 6,061,472 | A | 5/2000 | Hullender et al. | 382/187 |
| 6,069,626 | A | 5/2000 | Cline et al. | 715/786 |
| 6,081,829 | A | 6/2000 | Sidana | 709/203 |
| 6,108,445 | A | 8/2000 | Uehara | 382/189 |
| 6,128,007 | A | 10/2000 | Seybold | 345/179 |
| 6,128,633 | A | 10/2000 | Michelman et al. | 715/525 |
| 6,154,219 | A | 11/2000 | Wiley et al. | 345/587 |
| 6,154,758 | A | 11/2000 | Chiang | 715/541 |
| 6,188,405 | B1 | 2/2001 | Czerwinski et al. | 715/764 |
| 6,195,094 | B1 | 2/2001 | Celebiler | 345/157 |
| 6,199,125 | B1 | 3/2001 | Cortesi | 710/67 |
| 6,223,145 | B1 | 4/2001 | Hearst | 703/22 |
| 6,243,258 | B1 | 6/2001 | Paratore | 361/680 |
| 6,279,014 | B1 | 8/2001 | Schilit et al. | 715/512 |
| 6,295,372 | B1 | 9/2001 | Hawkins et al. | 382/187 |
| 6,304,272 | B1 | 10/2001 | Schanel et al. | 345/676 |
| 6,337,698 | B1 | 1/2002 | Keely, Jr. et al. | 715/823 |
| 6,340,967 | B1 | 1/2002 | Maxted | 345/179 |
| 6,345,389 | B1 | 2/2002 | Dureau | 725/116 |
| 6,348,935 | B1 | 2/2002 | Malacinski et al. | 715/853 |
| 6,355,889 | B1 | 3/2002 | Butcher | 178/18.03 |
| 6,380,957 | B1 | 4/2002 | Banning | 715/828 |
| 6,487,567 | B1 | 11/2002 | Michelman et al. | 715/525 |
| 6,487,569 | B1 | 11/2002 | Lui et al. | 715/530 |
| 6,529,215 | B2 | 3/2003 | Golovchinsky et al. | 715/764 |
| 6,546,397 | B1 | 4/2003 | Rempell | 707/102 |
| 6,559,871 | B1 | 5/2003 | Brozowski et al. | 715/853 |
| 6,565,611 | B1 | 5/2003 | Wilcox et al. | 715/541 |
| 6,570,596 | B2 | 5/2003 | Frederiksen | 715/808 |
| 6,594,390 | B2 | 7/2003 | Frink et al. | 382/187 |
| 6,650,347 | B1 | 11/2003 | Nulu et al. | 715/853 |
| 6,651,221 | B1 | 11/2003 | Thomason et al. | 715/541 |
| 6,654,035 | B1 | 11/2003 | DeStefano | 715/798 |
| 6,661,409 | B2 | 12/2003 | Demartines et al. | 345/173 |
| 6,678,865 | B1 | 1/2004 | Pratley et al. | 715/509 |
| 6,681,045 | B1 | 1/2004 | Lapstun et al. | 382/187 |
| 6,683,600 | B1 | 1/2004 | Lui | 345/179 |
| 6,690,364 | B1 | 2/2004 | Webb | 345/173 |
| 6,727,927 | B1 | 4/2004 | Dempski et al. | 715/853 |
| 6,741,749 | B2 | 5/2004 | Herbert, Jr. | 382/246 |
| 6,801,190 | B1 | 10/2004 | Robinson et al. | 345/173 |
| 6,833,827 | B2 | 12/2004 | Lui et al. | 345/173 |
| 6,836,759 | B1 | 12/2004 | Williamson et al. | 704/235 |
| 6,859,909 | B1 | 2/2005 | Lerner et al. | 715/512 |
| 6,989,822 | B2 | 1/2006 | Pettiross et al. | 345/179 |
| 7,002,560 | B2 | 2/2006 | Graham | 345/179 |
| 7,039,234 | B2 | 5/2006 | Geidl et al. | 382/187 |
| 7,055,110 | B2 | 5/2006 | Kupka | 715/863 |
| 7,079,713 | B2 * | 7/2006 | Simmons | 382/321 |
| 7,091,959 | B1 | 8/2006 | Clary | 345/173 |
| 7,096,432 | B2 | 8/2006 | Huapaya et al. | 715/863 |
| 7,174,042 | B1 | 2/2007 | Simmons et al. | 382/187 |
| 7,185,278 | B1 | 2/2007 | Simmons | 715/235 |
| 7,188,309 | B2 | 3/2007 | Simmons et al. | 715/244 |
| 7,240,300 | B2 | 7/2007 | Jaeger | 715/863 |
| 7,259,752 | B1 | 8/2007 | Simmons | 345/173 |
| 7,259,753 | B2 | 8/2007 | Keely et al. | 345/179 |
| 7,353,453 | B1 | 4/2008 | Simmons | 715/268 |
| 7,358,965 | B2 | 4/2008 | Barabe et al. | 345/179 |
| 7,370,288 | B1 | 5/2008 | Simmons et al. | 715/854 |
| 7,526,737 | B2 | 4/2009 | Simmons et al. | |
| 7,721,226 | B2 | 5/2010 | Barabe et al. | 715/856 |
| 2001/0000960 | A1 | 5/2001 | Dettloff | 343/748 |
| 2002/0078035 | A1 | 6/2002 | Frank et al. | 707/3 |
| 2002/0097270 | A1 | 7/2002 | Keely et al. | 345/764 |
| 2002/0126153 | A1 | 9/2002 | Withers et al. | 345/773 |
| 2003/0066031 | A1 | 4/2003 | Laane | 715/513 |
| 2003/0071850 | A1 | 4/2003 | Geidl | 345/781 |
| 2003/0085931 | A1 | 5/2003 | Card et al. | 345/853 |
| 2003/0119469 | A1 | 6/2003 | Karr et al. | 455/307 |
| 2003/0214491 | A1 | 11/2003 | Keely et al. | 345/179 |
| 2003/0214531 | A1 | 11/2003 | Chambers et al. | 345/764 |
| 2003/0215142 | A1 | 11/2003 | Gounares | 382/190 |
| 2003/0227491 | A1 | 12/2003 | Moehrle | 345/854 |
| 2004/0003350 | A1 | 1/2004 | Simmons et al. | 715/517 |
| 2004/0021701 | A1 | 2/2004 | Iwema et al. | 345/863 |
| 2004/0060000 | A1 | 3/2004 | Jaeger | 715/502 |
| 2004/0135824 | A1 | 7/2004 | Fitzmaurice | 345/856 |
| 2004/0141015 | A1 | 7/2004 | Fitzmaurice et al. | 345/856 |
| 2005/0028081 | A1 | 2/2005 | Arcuri et al. | 715/501.1 |
| 2005/0179647 | A1 | 8/2005 | Simmons et al. | 345/156 |
| 2005/0183029 | A1 | 8/2005 | Barabe et al. | 715/779 |
| 2005/0206627 | A1 | 9/2005 | Simmons | 345/179 |
| 2006/0001656 | A1 | 1/2006 | LaViola et al. | 345/179 |
| 2006/0267967 | A1 | 11/2006 | Hinckley et al. | 345/179 |

FOREIGN PATENT DOCUMENTS

| | | |
|---|---|---|
| EP | 0 460 420 A3 | 12/1991 |
| EP | 0 780 797 A | 6/1997 |
| EP | 1 376 390 A | 1/2004 |
| EP | 1 450 294 A1 | 8/2004 |
| EP | 1 486 883 A2 | 12/2004 |
| GB | 2 313 993 A | 12/1997 |
| JP | 3-270403 | 12/1991 |

OTHER PUBLICATIONS

U.S. Official Action mailed Jan. 10, 2008, in U.S. Appl. No. 10/804,616.

U.S. Official Action mailed Jul. 12, 2007, in U.S. Appl. No. 10/804,616.
U.S. Official Action mailed Aug. 5, 2008, in U.S. Appl. No. 10/781,489.
U.S. Official Action mailed Dec. 27, 2007, in U.S. Appl. No. 10/781,489.
U.S. Official Action mailed Jun. 28, 2007, in U.S. Appl. No. 10/781,489.
U.S. Official Action mailed Nov. 7, 2006, in U.S. Appl. No. 10/781,489.
U.S. Official Action mailed Apr. 20, 2006, in U.S. Appl. No. 10/781,489.
U.S. Official Action mailed Aug. 20, 2008, in U.S. Appl. No. 10/780,366.
U.S. Official Action mailed Nov. 14, 2007, in U.S. Appl. No. 10/780,366.
U.S. Official Action mailed Sep. 20, 2005, in U.S. Appl. No. 10/186,463.
U.S. Official Action mailed May 18, 2007, in U.S. Appl. No. 10/186,820.
U.S. Official Action mailed Nov. 24, 2006, in U.S. Appl. No. 10/186,820.
U.S. Official Action mailed Nov. 9, 2006, in U.S. Appl. No. 10/186,820.
U.S. Official Action mailed Mar. 2, 2006, in U.S. Appl. No. 10/186,820.
U.S. Official Action mailed Aug. 10, 2005, in U.S. Appl. No. 10/186,820.
U.S. Official Action mailed Mar. 1, 2006, in U.S. Appl. No. 10/186,837.
U.S. Official Action mailed Dec. 17, 2004, in U.S. Appl. No. 10/186,837.
U.S. Official Action mailed May 25, 2005, in U.S. Appl. No. 10/186,837.
U.S. Official Action mailed Mar. 13, 2006, in U.S. Appl. No. 10/186,812.
U.S. Official Action mailed Jul. 13, 2005, in U.S. Appl. No. 10/186,812.
U.S. Official Action mailed Feb. 28, 2005, in U.S. Appl. No. 10/186,812.
U.S. Official Action mailed Apr. 21, 2006, in U.S. Appl. No. 10/186,865.
U.S. Official Action mailed Sep. 20, 2005, in U.S. Appl. No. 10/186,865.
U.S. Official Action mailed Aug. 22, 2007, in U.S. Appl. No. 10/186,874.
U.S. Official Action mailed Jan. 3, 2007, in U.S. Appl. No. 10/186,874.
U.S. Official Action mailed Aug. 10, 2006, in U.S. Appl. No. 10/186,874.
U.S. Official Action mailed Jun. 29, 2005, in U.S. Appl. No. 10/186,874.
U.S. Official Action mailed Sep. 15, 2006, in U.S. Appl. No. 10/186,847.
U.S. Official Action mailed Jan. 27, 2006, in U.S. Appl. No. 10/186,847.
U.S. Official Action mailed Jul. 27, 2005, in U.S. Appl. No. 10/186,847.
U.S. Official Action mailed Nov. 12, 2008, in U.S. Appl. No. 10/782,133.
U.S. Official Action mailed Feb. 20, 2008, in U.S. Appl. No. 10/782,133.
U.S. Official Action mailed Sep. 18, 2007, in U.S. Appl. No. 10/782,133.
U.S. Official Action mailed Mar. 2, 2007, in U.S. Appl. No. 10/782,133.
U.S. Official Action mailed Jan. 3, 2007, in U.S. Appl. No. 10/782,132.
U.S. Official Action mailed May 29, 2008, in U.S. Appl. No. 11/272,960.
U.S. Appl. No. 10/780,366, filed Feb. 17, 2004, entitled "Writing Guide for a Free-Form Document Editor", Inventors: Alex Simmons et al.
Microsoft Word 2000, Microsoft Corporation (9.0.6926 p3).
Thomas Jakobsen, "Advanced Character Physics," 2001, Proceedings, Game Developer's Conference 2001, pp. 1-17.
European Search Report, Nov. 11, 2005.
Wacom Intuos TM User's Manual for Windows, May 22, 2000, copyright Wacom Company, Ltd., pp. 1-165 (Part 1: pp. 1-60; Part 2: pp. 61-120 ; Part 3: pp. 121-165).
U.S. Official Action mailed Feb. 3, 2009, in U.S. Appl. No. 10/781,489.
U.S. Official Action mailed Jun. 11, 2009, in U.S. Appl. No. 10/782,133.
Wilcox et al., "Dynomite: A Dynamically Organized Ink and Audio Notebook," Computer-Human Interaction, Mar. 27, 1997, pp. 186-193.
Fitzmaurice et al., "Tracking Menus," CHI 2003, vol. 5, No. 2, pp. 71-80, 2003.
Wilcox et al., "Dynomite: A Dynamically Organized Ink and Audio Notebook," Computer-Human Interaction, Mar. 1997, pp. 186-193.
U.S. Office Action mailed Dec. 12, 2009, in U.S. Appl. No. 10/782,133, pp. 1-15.

* cited by examiner

METHOD AND SYSTEM FOR DISPLAYING AND LINKING INK OBJECTS WITH RECOGNIZED TEXT AND OBJECTS

CROSS-REFERENCE TO RELATED PATENT APPLICATIONS

This application is a continuation of application Ser. No. 10/186,463, filed Jun. 28, 2002, which application is incorporated herein by reference.

This patent application is also related to the following non-provisional patent applications: U.S. patent application Ser. No. 10/186,388, entitled "Writing Guide for a Free-Form Document Editor"; U.S. patent application Ser. No. 10/186,388, entitled "Method and System for Editing Electronic Ink"; U.S. patent application Ser. No. 10/186,874, entitled "Method and System for Selecting Objects on a Display Device"; U.S. patent application Ser. No. 10/186,812, entitled "Resolving Document Object Collisions"; U.S. patent application Ser. No. 10/186,837, entitled "Space Management for Electronic Documents"; U.S. patent application Ser. No. 10/186,865, entitled "System and Method for Automatically Recognizing Electronic Handwriting in an Electronic Document and Converting to Text"; U.S. patent application Ser. No. 10/186,820, entitled "Method and System for Categorizing Data Objects with Designation Tools". These applications and the application herein are all being filed on the same date, Jun. 28, 2002, and are assigned to the Microsoft Corporation. All of the aforementioned applications are hereby incorporated by reference.

TECHNICAL FIELD

The present invention relates to editing electronic documents and more specifically relates to a user interface for editing text in an electronic document that was converted from electronic ink.

BACKGROUND OF THE INVENTION

One of the simplest methods of recording and communicating information is the traditional method of writing the information down on a piece of paper with a writing instrument such as a pen. Writing information by hand on a piece of paper is inexpensive and can be done quickly and easily with little preparation. The traditional method is also flexible in that a writer can generally write in any format anywhere on the page. One of the limitations with handwritten work is that it is not easily manipulated or transferred to other contexts. In other words, changing or transferring a piece of handwritten text typically requires rewriting the text on another medium.

With the widespread use of personal computers, textual information often is recorded using word processing software running on a personal computer. The advantage of such electronic methods for recording information is that the information can be easily stored and transferred to other remote computing devices and electronic media. Such electronically recorded text can also be easily corrected, modified, and manipulated in a variety of different ways.

Typical computer systems, especially computer systems using graphical user interface (GUI) systems such as Microsoft WINDOWS, are optimized for accepting user input from one or more discrete input devices. Common input devices include a keyboard for entering text and a pointing device, such as a mouse with one or more buttons, for controlling the user interface. The keyboard and mouse interface facilitates creation and modification of electronic documents including text, spreadsheets, database fields, drawings, and photos.

One of the limitations with conventional GUI systems is that a user must generally type the text they are entering into the personal computer using the keyboard. Entering text using a keyboard is generally slower and more cumbersome than handwriting. Although recent advances have been made in reducing the size of personal computers, they are still not as portable and easily accessible as traditional paper and pen. Furthermore, traditional pen and paper provide the user with considerable flexibility for editing a document, recording notes in the margin, and drawing figures and shapes. In some instances, a user may prefer to use a pen to mark-up a document rather than review the document on-screen because of the ability to freely make notes outside of the confines of the keyboard and mouse interface.

To address the shortcomings of traditional keyboard and mouse interfaces, there have been various attempts to create an electronic tablet that can record handwriting. Such electronic tablets typically comprise a screen and a handheld device that is similar to a pen (also referred to as a stylus). A user can manipulate the pen to write on the electronic tablet in a manner similar to the use of traditional pen and paper. The electronic tablet can "read" the strokes of the user's handwriting with the handheld device and render the handwriting in electronic form on the tablet's screen and/or the computer's display as "electronic ink". This electronic tablet approach can be employed in a variety of ways including, on a personal computer and on a handheld computing device.

Recently, other computer systems have been developed that provide for more sophisticated creation and manipulation of electronic ink. For example, some conventional software applications permit one to add electronic ink to a document. The software applications store the ink and provide it to a user when requested. Other applications (for example, drawing applications associated with the Palm and PocketPC operating systems) permit the capture and storage of drawings. These drawings include other properties associated with the ink strokes used to make up the drawings. For instance, line width and color may be stored with the ink. One goal of these systems is to replicate the look and feel of physical ink being applied to a piece of paper.

Replicating the look and feel of physical ink requires computer systems that work with electronic ink to handle this electronic ink differently than traditional electronic text and images that can be displayed on a display device. Unlike word processors that handle only one or two types of page objects such as text and images, computer systems that work with electronic ink usually need to handle multiple types of page objects that can include bit map images, drawing objects, and outline objects. Each outline object can include one or more nodes where each node can include at least one of text, a picture, and an ink object.

While conventional computer systems have the capability to handle electronic ink, conventional computer systems have very limited electronic ink conversion systems that recognize the electronic ink and covert it into text. The limitations of the conventional electronic ink conversion systems usually is apparent in the text editors. Correcting text that was converted from electronic ink can be very difficult and time consuming with the conventional art. Specifically, if multiple pages of electronic ink are converted at the same time, the converted text editor works in a modal fashion. This means, that upon starting the text editor of the conventional art, the editing process cannot be stopped until all pages have been corrected. Also, temporary exiting from the editing process is not permitted. This means that if only a few pages out of a plurality of pages were desired to be corrected, fewer pages less than the plurality of pages cannot be processed.

Another problem with conventional computer systems is that they seldom provide a way to assist in the correction of words converted from electronic ink. In other words, the conventional art will typically rely on the user to discover any discrepancies or conversion errors between the electronic ink and the converted text. Also the conventional art to does not provide a convenient and user friendly way to split words that have been inadvertently combined by the ink recognition system.

Another shortfall of conventional computer systems is that text editors do not provide adequate assistance to the user. In other words, conventional computer systems the convert electronic ink to text usually do not offer a ranked order of recommendations for misspelled words or new words that may not be part of a computer system's dictionary.

Accordingly there is a need in the art for a method and system for editing text converted from electronic ink that permits suspension of action or exiting from the system as needed prior to completion of the editing process. There is also a need in the art that permits completion of an editing process even if only a few pages of a plurality of pages have been edited. Another need exists in the art for a method and system that permits storage of text pages as the editing for each text page is completed. A further need exists in the art for a method and system that can provide logical and ranked recommendations for words that are difficult to convert to text from electronic ink. Another need exists in the art for a method and system that permits selection of a break point in a group of words that have been inadvertently combined by an ink conversion system.

SUMMARY OF THE INVENTION

The present invention provides an efficient way to edit text that can be converted from recognized electronic ink. More specifically, a user interface can display electronic ink in one section of a display device and corresponding recognized or converted text in another section of the display device that was generated from a electronic ink recognition system. The converted or recognized text can be easily compared to the electronic ink to detect any ink conversion errors if ink conversion errors are present. The amount of data displayed in each section on the display device can be a page. However, in some instances, depending upon the size of the electronic ink, the font size of the converted text, and the size of the display device, whole pages may or may not be displayable. In such cases where whole pages cannot be displayed for both the converted text and electronic ink, scrollable pages for the electronic ink section and the converted text page section can be displayed by the user interface.

When a word is selected in the text section displayed on the user interface, the user interface can identify through mechanisms such as highlighting the corresponding electronic ink word. The term, "selected" or "select" can mean marking or identifying an object displayed on a display device for a later operation. Similarly, when a word in the electronic ink section is selected, the user interface can identify through highlighting the corresponding converted text.

According to one inventive aspect of the present invention, each page of electronic ink and each corresponding page of converted or recognized text are linked to one another. In other words, each page of electronic ink can be displayed only with its corresponding page of converted or recognized text until a command or message is received that editing of the converted or recognized text has been completed. Once the command or message is received that editing of the converted or recognized text has been completed, then the link between an electronic ink page and its corresponding converted text page is broken. This means that the converted text page can now be saved independently of its corresponding electronic ink page.

Another inventive aspect of the present invention is that editing of linked pages can be completed individually if a set of electronic ink pages have been converted. This means that when editing of a single electronic ink page and its corresponding converted text has been completed, the converted text can be saved separate from its corresponding electronic ink as well as separate from the remaining converted text pages that have not been edited.

According to another inventive aspect, the user interface can be stopped or interrupted at any time. This means, for one example, that if several pages of converted text and electronic ink have been edited and indicated as completed, the user interface can allow the storage of the converted text pages separate from pages that have not been edited to permit access to other programs. Unlike conventional electronic ink conversion systems, the present invention is not modal meaning that a user is not forced to complete editing of electronic ink before access is permitted to other programs. The present invention is flexible and permits editing of as few or as many linked pages as is desired. In this way, a user can return to editing a set of linked pages to the same point where editing of the linked pages was previously stopped.

According to another exemplary inventive aspect of the invention, a menu comprising recommendations for converted text can be displayed upon selecting a word in the converted text section of the user interface. More specifically, according to one exemplary embodiment, upon selecting a word in the converted text and "right-clicking" a screen pointing device such as a mouse, the user interface can display a menu of alternate spellings of the converted text word that correspond with recommendations made by the electronic ink recognition system when it converted the text. The list of alternate words can be ranked by the ink recognition system in order to increase the chance that lower ranked words from the list are closer to the correct electronic ink word that was being converted.

According to another alternate exemplary aspect of the present invention, the user interface can display a splitting mechanism that permits a user to split up converted text that may have been inadvertently grouped together as a single word. Stated differently, the present invention receives user input as to the location of the break between words when the grouped text should have been recognized as two or more words.

DETAILED DESCRIPTION OF EXEMPLARY EMBODIMENTS

A user interface can display electronic ink in one section of a display device and corresponding recognized or converted text in another section of the display device that was generated from a electronic ink recognition system. Each page of electronic ink and each corresponding page of converted or recognized text are linked to one another. In other words, each page of electronic ink can be displayed only with its corresponding page of converted or recognized text until a command or message is received that editing of the converted or recognized text has been completed. Once the command or message is received that editing of the converted or recognized text has been completed, then the link between an electronic ink page and its corresponding converted text page is broken. This means that the converted text page can now be saved independently of its corresponding electronic ink page. This allows pages to be saved and converted as they are edited.

An Exemplary Operating Environment

Figure 1:
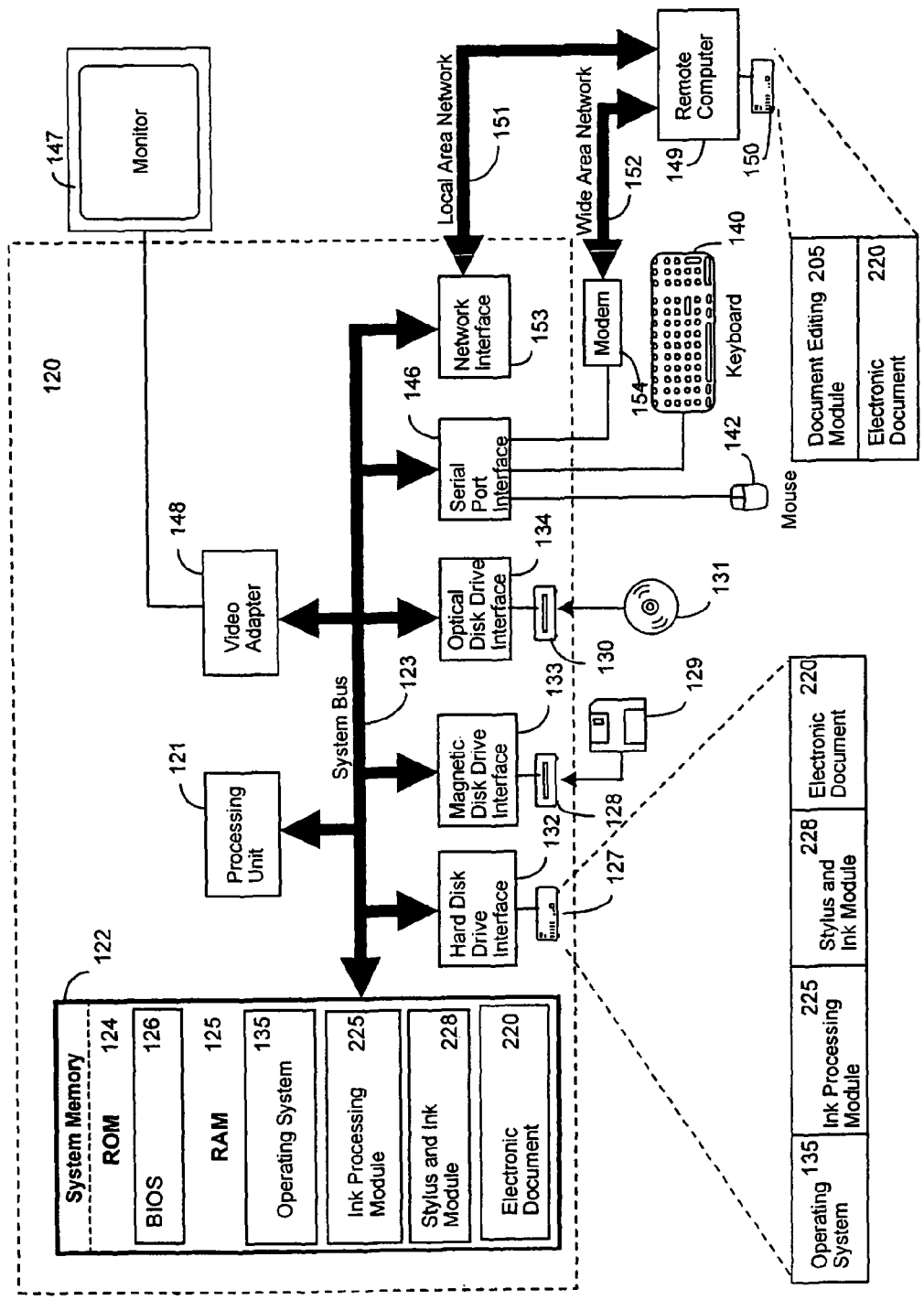
FIG. 1 is a block diagram illustrating an exemplary operating environment for implementation of various embodiments of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively. Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, a document editor 136, a space management module 138, and an electronic document 139. Program modules include routines, sub-routines, programs, objects, components, data structures, etc., which perform particular tasks or implement particular abstract data types. Aspects of the present invention may be implemented in the form of a ink processing module 225 that can operate in concert with a stylus and ink module 228 to edit an electronic document 139.

A user may enter commands and information into personal computer 120 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to the personal computer 120, only a memory storage device 150 has been illustrated in the Figure. The logical connections depicted in the Figure include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
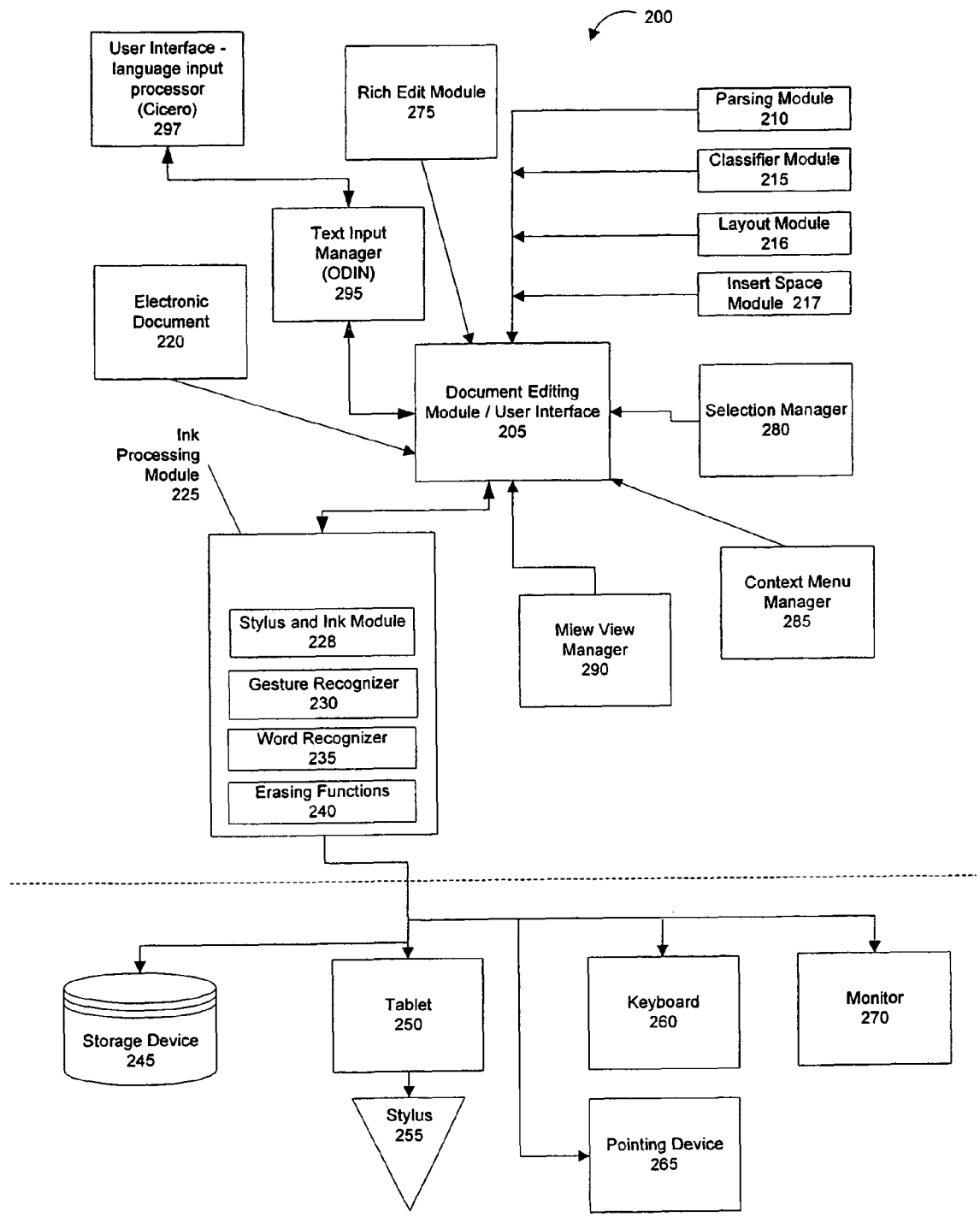
FIG. 2 is a block diagram depicting the primary functional components of an exemplary free-form document editor and related input devices.

Referring to FIG. 2, an exemplary architecture 200 is illustrated for editing electronic ink in accordance with an embodiment of the present invention. FIG. 2 shows typical hardware and software components used in operating the invention from a functional perspective. Conventional input devices are represented by the keyboard 260 and the pointing device (mouse) 265. A user can enter commands and information into the computer 20 using the input devices. Other input devices (not shown) may include a microphone, joystick, game pad, satellite dish, and scanner. A conventional output device, such as monitor 270, is used to display information from the computer 20. Other output devices (not shown) can include a printer or speaker. Other hardware components shown in FIG. 2 include an electronic tablet 250 and an accompanying stylus 255. The tablet 250 and stylus 255 are used to input handwriting strokes which are converted to collections of data that can be represented as electronic ink. The electronic ink may be incorporated into an electronic document 220 and may be displayed on either the electronic tablet 250, the monitor 270, or both. Although the electronic tablet 250 and the monitor 270 are illustrated as being distinct, in the preferred embodiment they are either coupled or form a single component. The joint tablet/monitor component has the ability to display information and receive input from the stylus 255. Also shown among the hardware components is a conventional electronic storage device 245 such as a hard drive or RAM.

In the representative architecture 200 all of the hardware components are coupled to an ink processing software module 225. It should be understood by those skilled in the art that FIG. 2 is merely representative and that in practice the hardware components typically are coupled to the elements shown in FIG. 1. The ink processing module 225 is operable for receiving data from the electronic tablet 250 and/or the stylus 255 and rendering that data as electronic ink. In the preferred and exemplary embodiment embodiment, the ink processing module 225 is a collection of software modules that perform different tasks for rendering handwriting strokes as electronic ink. For example, the stylus and ink module 228 can receive data describing the positions and angles of the stylus for a series of handwriting strokes. The stylus and ink module 228 can interpret the data for rendering electronic ink. Other software modules, such as a gesture recognizer 230 and word recognizer 235 can be designed to identify certain handwriting strokes and assign them a particular significance. For example, certain gestures such as a cross-out may be recognized and associated with other editing processes. The ink processing module 225 can also include an erasing functions module 240 for removing electronic ink that has been previously rendered.

Although ink processing modules are known in the art and necessary for an electronic tablet to function, what is needed is a document editing module, such as the one shown in FIG. 2, that enhances the performance of an electronic tablet. Specifically, document editing module 205 facilitates the manipulation of electronic ink so that a user can create and manipulate an electronic document 220 with greater ease and sophistication. The document editing module 205 typically comprises a collection of software modules for controlling and manipulating electronic ink rendered on the monitor 270. For example, a parsing module 210 can be used to identify handwriting strokes that are selected by the user for editing. Selected strokes may by highlighted or shaded to assist the user in identifying which strokes are to be edited. A classifier module 215 can identify certain handwriting strokes as being part of a word or drawing. Software modules such as the layout module 216 and the insert space module 217 can be designed to control how electronic ink is rendered and moved. Other modules can include a selection manager 280, a context menu manager 285, a miew view manager 290, a text input manager 295, and a user interface language input processor 297. The selection manager 280 can monitor how converted text or electronic ink is selected for editing by the user. The context menu manager 285 can monitor the selection of a list of alternate words that can be displayed when a user edits a word in converted text. The miew view manager 285 can render the user interface comprising a display screen that has page of converted text linked to a page of corresponding electronic ink. The text input manager 295 can operate as an interface for a user interface language input processor 297 that uses language rules to assist in the recognition of words through context.

The modules shown in FIG. 2 are representative and those skilled in the art should understand that other modules may also be part of or coupled to the document editing module 205. For example, the document editing module 205 may also work with a rich edit module 275 that provides added functionality such as monitoring and controlling the selection of text and word wrapping.

The present invention includes multiple computer programs which embodies the functions described herein and illustrated in the exemplary display screens and the appended flow chart. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary display screens and flow charts and associated description in the application text, for example. Therefore, disclosure of a particular set of program code instructions is not considered necessary for an adequate understanding how to make and use the invention. The inventive functionality of the claimed computer program will be explained in more detail in the following description in conjunction with the remaining Figures illustrating the functions and program flow.

Figure 3:
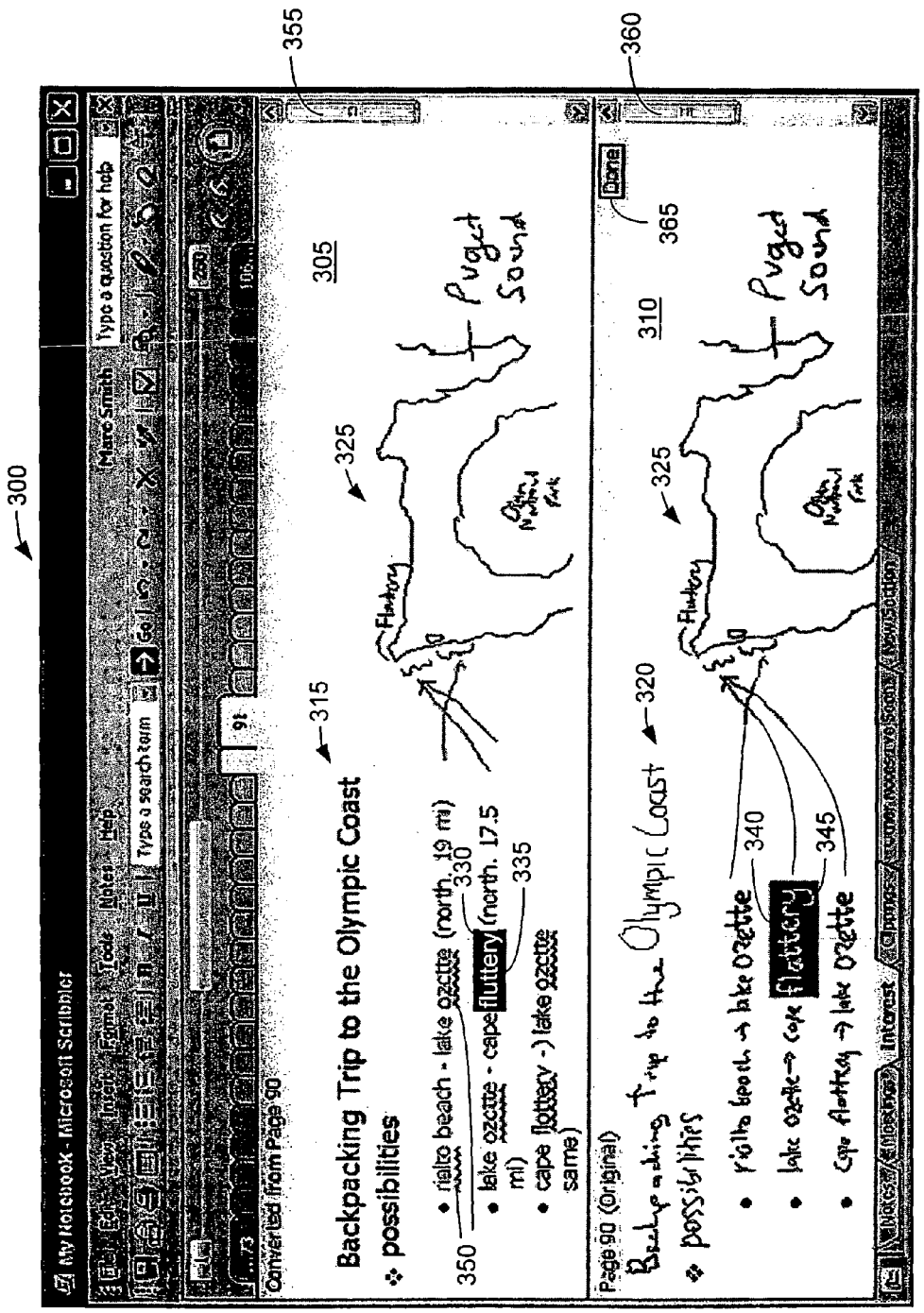
FIG. 3 is an exemplary display screen that illustrates how words in a text section are highlighted to correspond with the words that are highlighted in an electronic ink section of a user interface according to one exemplary embodiment of the present invention.

Referring now to FIG. 3, exemplary display screen 300 can be generated by a display device such as the tablet 250 or monitor 270. However, the present invention is not limited to electronic tablet environments. The present invention can operate on any computer system that has a display device that may handle electronic ink, electronic text or electronic images or any combination thereof.

Exemplary display screen 300 can comprise a converted text section 305 that is separate from an original electronic ink section 310 by a line 307. Those skilled in the art will appreciate that the sizes of the converted text section 305 and electronic ink section 310 can be adjusted by the user. That is, if a different sized converted text section 305 is desired, then the line 307 can be moved in either an upward or downward direction relative to the display screen 300.

Converted text section 305 comprises converted text 315 that corresponds with electronic original ink 320. Converted text section 305 further comprises a picture 325 that corresponds with the picture 325 of electronic ink section 310.

In the converted text section 305, the word "flutteryl" 330 can be selected. The term, "selected" or "select" can mean marking or identifying an object displayed on a display device for a later operation. The selection of the word "flutteryl" 330 can be identified with mechanism such as highlighting 335. However, other identification mechanisms other than highlighting are not beyond scope of the present invention. For example, instead of identifying the word "flutteryl" 330 with highlighting 335, the word "flutteryl" 330 could be identified with italics, bold, or any other like methods to demonstrate the selection of text by a user.

When any word in the converted text 315 is selected, a corresponding word in the original electronic ink 320 is also flagged or identified for review. Therefore, when the word "flutteryl" 330 of converted text 315 was selected, the corresponding word in the original electronic ink 320 which is "flattery" 340 was flagged or identified with another highlighted portion 345.

Each word of the converted text 315 is compared to words in an electronic dictionary. Words that are either misspelled or are not present in the electronic dictionary are flagged with markers such as wavy underlines 350.

The converted text section 305 of the display screen 300 further comprises a scroll bar 355 that can be used to navigate through the entire page of the converted text. Similarly, the electronic ink section 310 also comprises a scroll bar 360 to permit navigation through the electronic ink section 310 of display screen 300.

The electronic ink section 310 also comprises a completion button 365 that can be activated when editing of the converted text section 305 and electronic ink section 310 has been completed. However, the present invention is not limited to an on-screen button 365. The function of the button 365 could easily be part of a drop down menu or other like user interfaces. If the completion or "done" button 365 is activated, a link between the converted text section 305 and the electronic ink section 310 is broken as will be discussed below with respect to FIG. 8.

Figure 4:
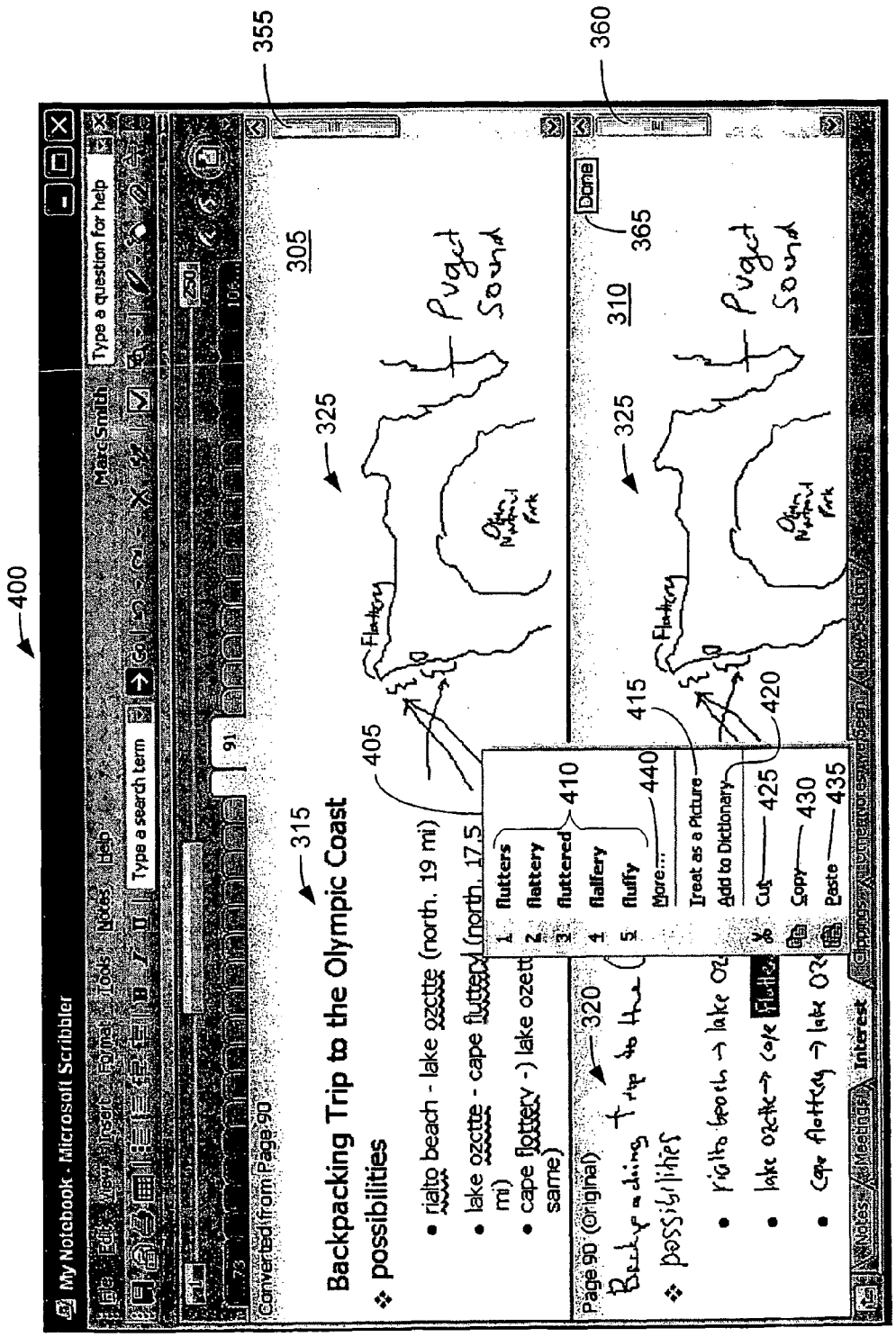
FIG. 4 is an exemplary display screen that illustrates a menu comprising recommendations for converted text according to one exemplary embodiment of the present invention.

Refer now to FIG. 4, this figure illustrates an exemplary display screen 400 in which a menu 405 is displayed in response to "right clicking" the word "flutteryl" 330. The menu 405 can comprise one or more ranked recommendations 410 as well as a reclassification command 415, a dictionary command 420, a cut command 425, a copy command 430, and a paste command 445. The recommendation 410 can comprise other words that are generated by the user interface language input processor 297 when the electronic ink 320 is processed. The user interface language input processor 297 determines what word in its dictionary appears closest to the electronic ink 320 being recognized.

The recommendations 410 are ranked meaning that a user interface language input processor 297 can "learn" patterns of recognized words after selections have been made by the user from the menu 405. The recommendations 410 having the lower number rankings are typically the words that have the higher probability of being the correct corresponding word relative to the recognized electronic ink 320.

Commands selected or options selected from menu 405 are generated and monitored by the context menu manager 285 as discussed above with respect to FIG. 2. The reclassification command 415 allows recognized ink to be reclassified as a drawing if the electronic ink that was recognized was intended to be a drawing instead of text. The add to the dictionary command 420 permits the addition of the current text to the dictionary as a new word so that in subsequent spell checks the current word is recognized.

Figure 5:
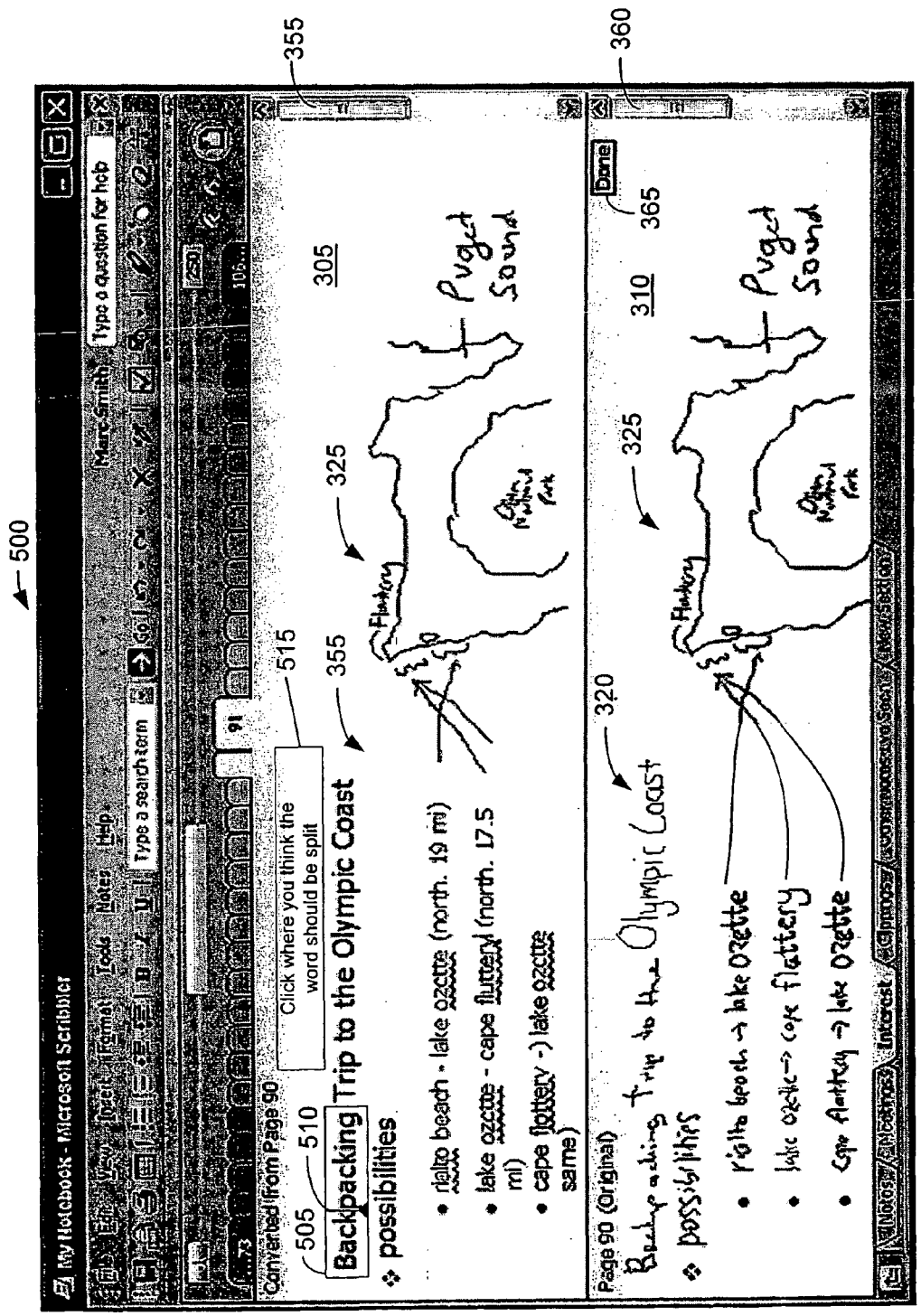
FIG. 5 is an exemplary display screen that illustrates an exemplary splitting mechanism that permits the separation or breaking up of converted text according to an exemplary embodiment of the present invention.

Referring now to FIG. 5, this figure illustrates an exemplary display screen 500 that comprises a splitting mechanism 505 where a break point 510 can be selected. In addition to the splitting mechanism 505, the exemplary display screen 500 further comprises text 515 to instruct how the splitting mechanism 505 can be used. The splitting mechanism 505 is designed to allow the separation of words that have been inadvertently grouped together by the user interface language input processor 297. In the exemplary embodiment illustrated in FIG. 5, the word "backpacking" can be split or divided with the splitting mechanism 505. The splitting mechanism 505 can be monitored and controlled by a parsing module 210 as illustrated and discussed above with respect to FIG. 2.

Figure 6:
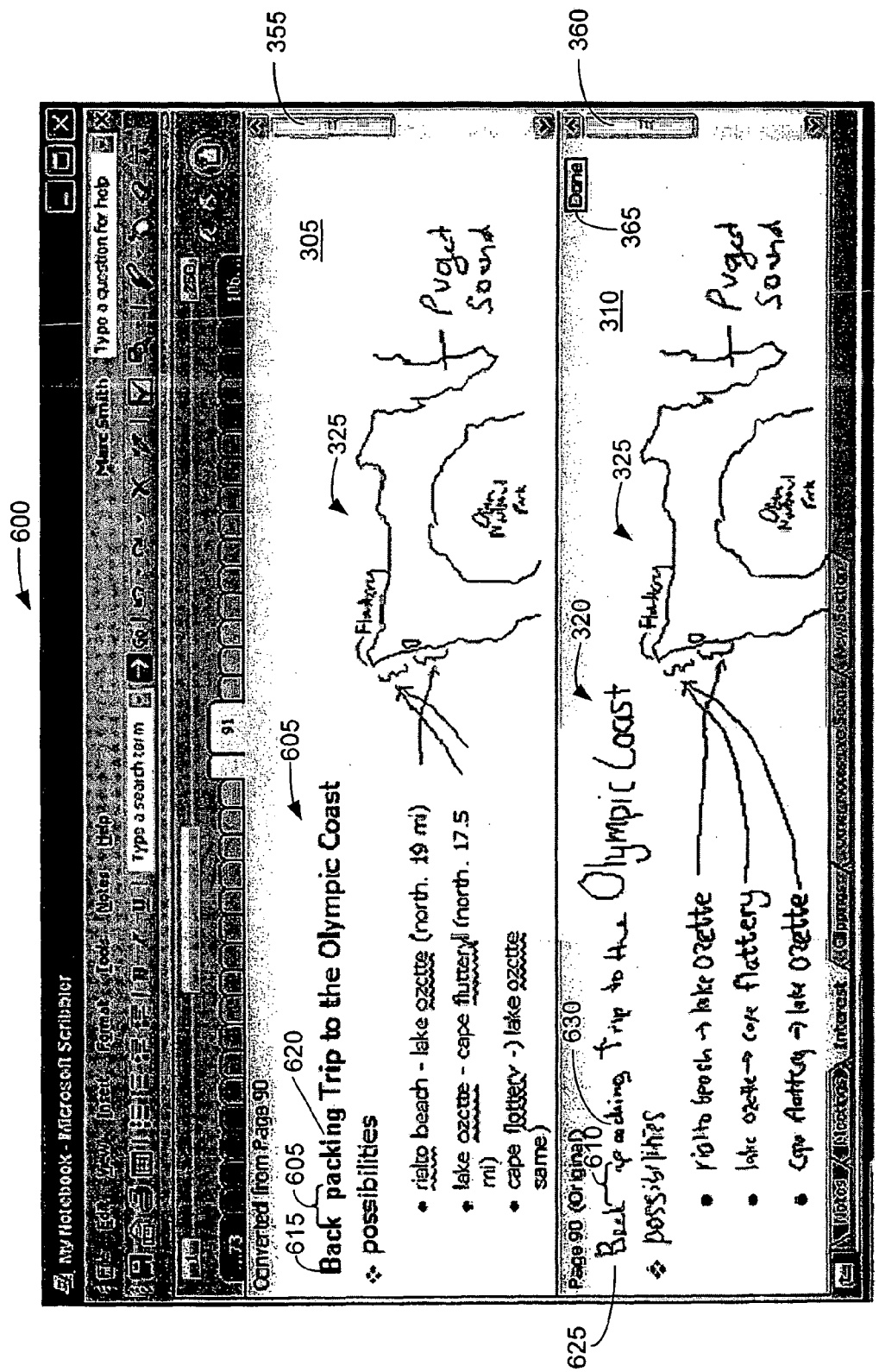
FIG. 6 is an exemplary display screen that illustrates how the converted text illustrated in FIG. 5 has been split apart according to an exemplary embodiment of the present invention.

Referring now to FIG. 6, this figure illustrates an exemplary display screen 600 that corresponds with the break point 510 that was selected in previous FIG. 5. Specifically, spaces 605 and 610 are now displayed between the text "back" 615 and the text "packing" 620. Similarly, with respect to the electronic ink 320, the word "back" 625 is separated from the electronic ink word "packing" 630 by space 610. In other words, in the exemplary embodiment illustrated in FIG. 6, any break points or spaces between the converted text 315 is translated to the electronic ink 320. However, it is noted that in one exemplary embodiment not illustrated, any spacing or new break points made with the splitting mechanism 505 to the converted text 315 is not translated to the electronic ink 320. That is, in one exemplary embodiment not illustrated, the space 610 is not generated for the electronic ink 320 if a break point is selected to separate the text word "back" 615 from the converted text word "packing" 620.

Figure 7:
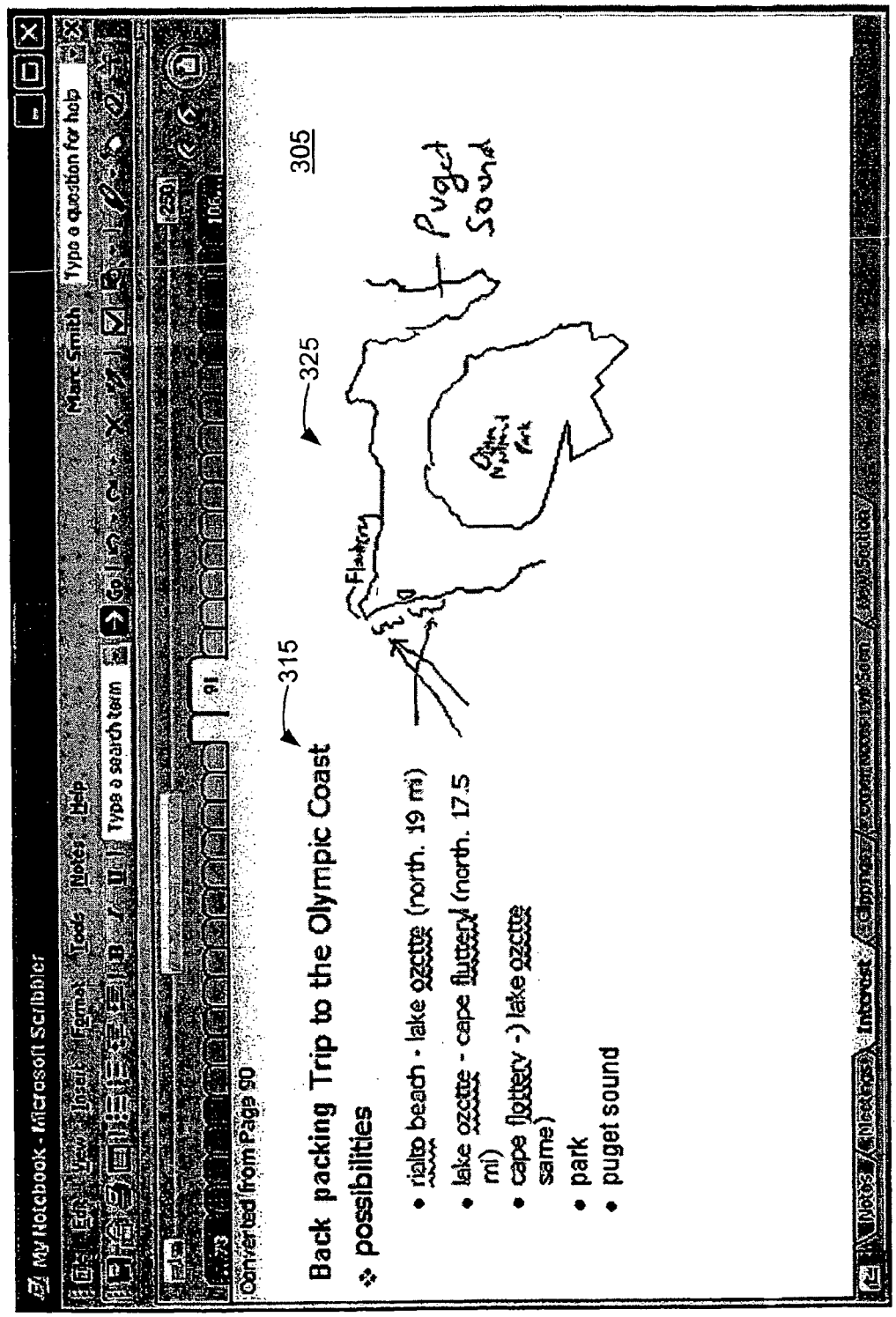
FIG. 7 is an exemplary display screen that illustrates a page of converted text that is unlinked from its corresponding page of electronic ink according to one exemplary embodiment of the present invention.

Referring now to FIG. 7, this figure illustrates exemplary display screen 700 where the converted text 315 is displayed completely separate from the previously displayed electronic ink 320. FIG. 7 illustrates the display screen 700 that can be displayed in response to activating the completion or "done" button 365 in which the editing of converted text has been ended or terminated. FIG. 7 also demonstrates that single pages of electronic ink can be converted and edited without requiring that all converted text pages be edited at once.

Figure 8:
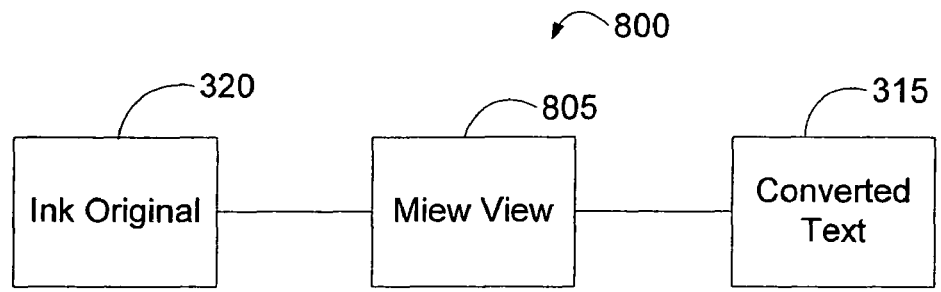
FIG. 8 is a functional block diagram illustrating the link between a page of electronic ink and a page of converted text according to one exemplary embodiment of the present invention.

Referring now to FIG. 8, this figure illustrates a functional block diagram demonstrating the links 800 that exist between the original electronic ink 320 and the converted text 315. The link 800 comprises a "miew" view 805 that is illustrated in FIGS. 3-6. In other words, the miew view 805 is the display screen or user interface that comprises the converted text section 305 separated from the electronic ink section 310 by separation line 307. The miew view 805 is a combination of a "mode" operation and a "view" for recognized text. And hence, the term "miew" view 805. Once the miew view link 805 is broken, the converted text 315 or the original ink 320 can be saved separately. Alternatively, the original ink 320 may already be saved in a separate storage area relative to the converted text 315, however, the file or page comprising electronic ink may contain a flag that indicates the miew view 805 is still activated and therefore requires the display of any converted text 315 to be shown simultaneously with the electronic ink 320 as illustrated in FIG. 3-6. As noted above, upon selecting the completion or "done" button 365, the miew view link 805 can be terminated or removed relative to the original electronic ink 320 and the converted text 315 that was previously displayed in the miew view 805 can now be displayed on separate screen relative to the original electronic ink 320.

Figure 9:
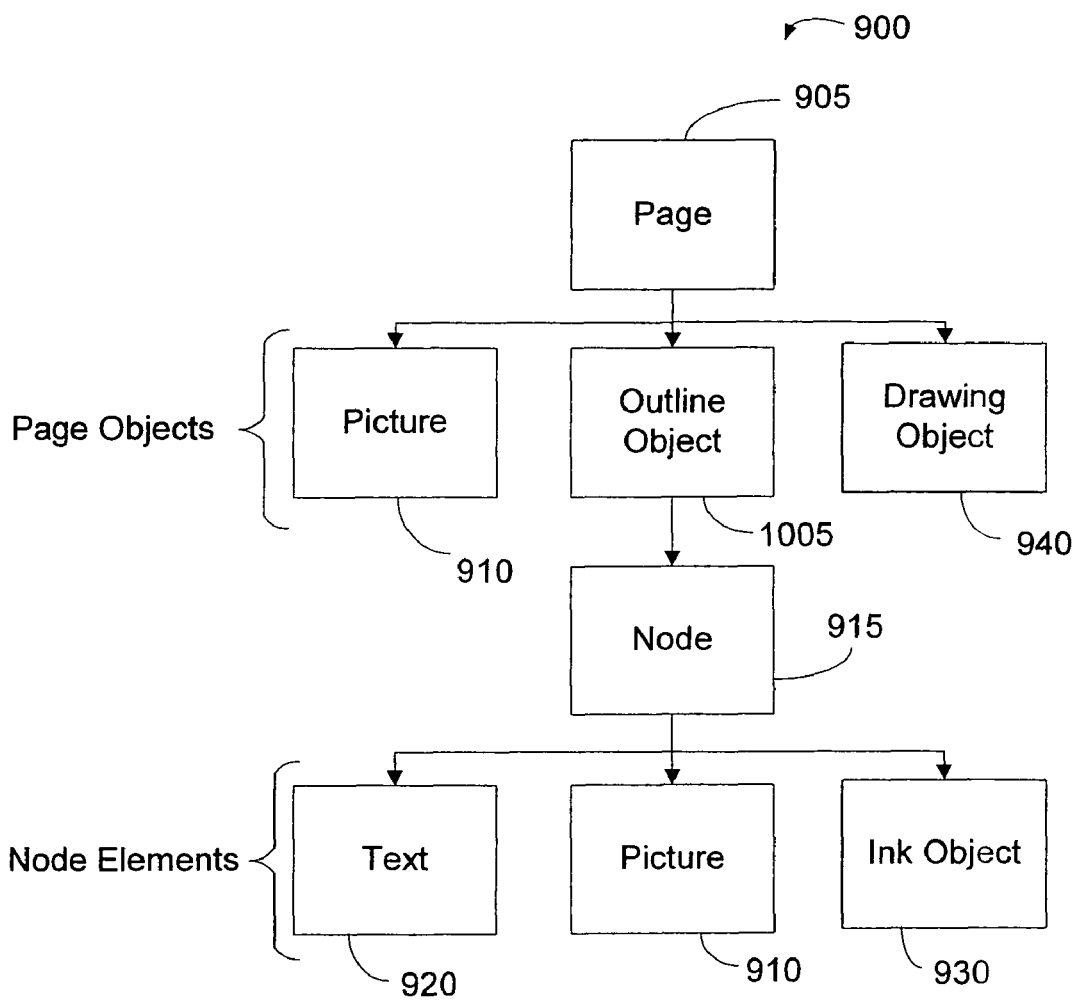
FIG. 9 is a functional block diagram illustrating the hierarchy of the different types of page objects that can be present on a display device according to one exemplary embodiment of the present invention.

Referring now to FIG. 9, this figure is a functional block diagram illustrating the hierarchy 900 of the different types of page objects that can be present on a display device according to one exemplary embodiment of the present invention. A page 905 can comprise one of three types of page objects: a bitmap image or image 910; an outline object 1005; and a drawing object 940. However, those skilled in the art will recognize that other types of page objects are not beyond the scope of the present invention.

Each outline object can comprise one or more nodes 915. Each node 915 can comprise on of three types of node elements: text 920, a bitmap image or picture 910, and an ink object 930. However, similar to the page objects described above, those skilled in the art recognize different types of node elements are not beyond the scope and spirit of the present invention. An ink object 930 typically comprises an object that is created with a stylus or some other screen pointing device that closely resembles how such an object would be formed with pen and paper. Meanwhile, a picture 910 can comprise an existing image stored in a file in memory or an image that is formed with a software program.

Figure 10:
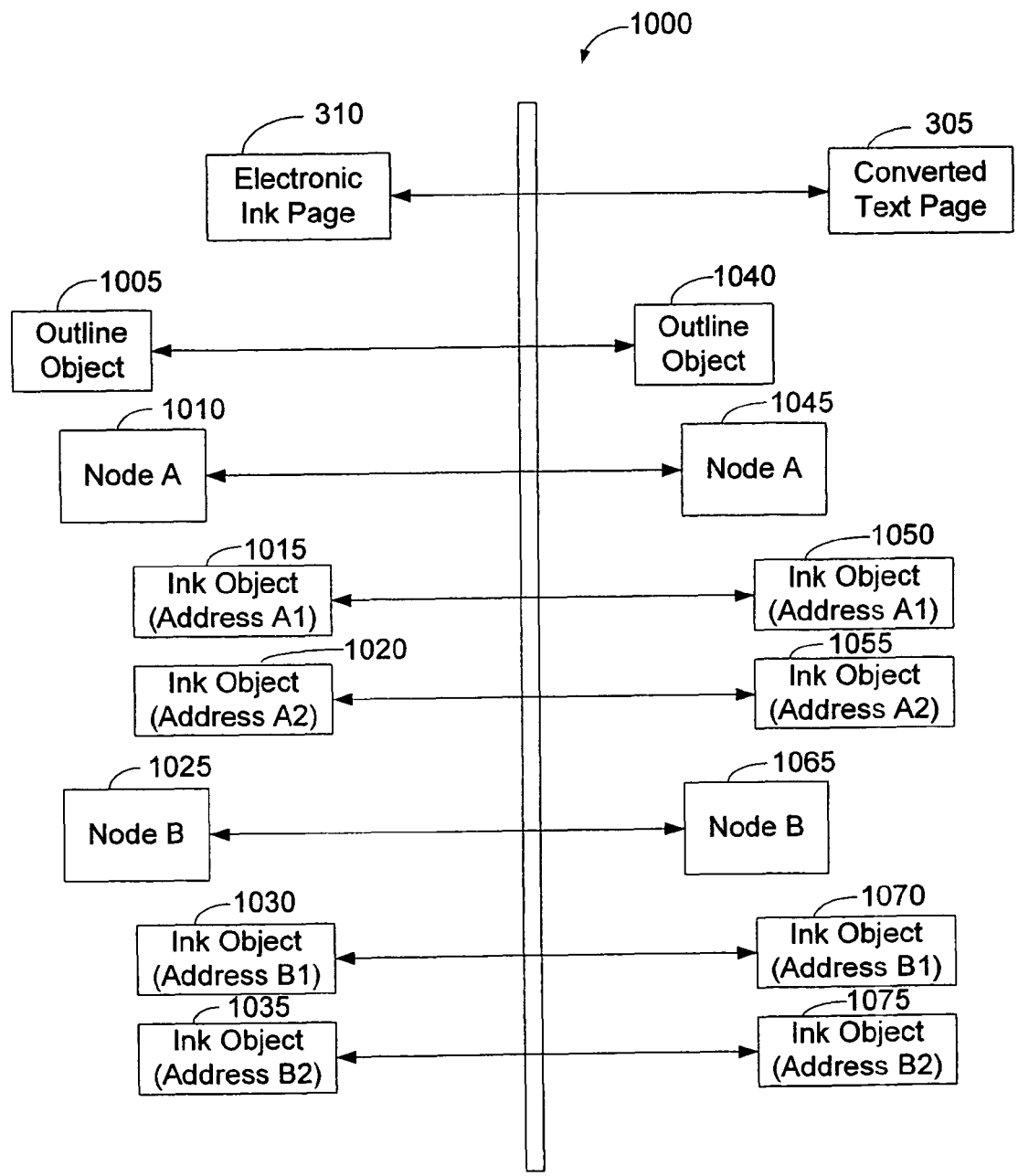
FIG. 10 is a functional block diagram illustrating an exemplary mapping structure that can exist between a page of electronic ink and a page of converted text according to one exemplary embodiment of the present invention.

Referring now to FIG. 10, this figure illustrates a functional block diagram depicting a mapping or tree hierarchy 1000 that can be accessed by the selection manager 280 in order to track the highlighting of the converted text 315 or electronic ink 320 that is being selected. The hierarchical tree 1000 comprises an electronic ink page 310 and a converted text page 305. The tree structure for the electronic ink page 310 further comprises a first outline object 1005. The first outline object 1005 further comprises a first node A 1010 and a second node B 1025. The first node A 1010 further comprises a first ink object 1015 and a second ink object 1020. The second node B 1025 further comprises a third ink object 1030 and a fourth ink object 1035.

Meanwhile, the converted text page 305 comprises a first ink outline object 1040. The first outline object 1040 further comprises a first node A 1045 that directly corresponds with the first node A 1010. The first node A 1045 of the converted text page 305 further comprises a first ink object 1050 and a second ink object 1055. The first ink object 1050 of the first node 1045 corresponds directly with the ink object 1015 having the address of A1. Similarly, the second ink object 1055 also corresponds with the second ink object 1020 having an address of A2.

The second node B 1065 of the converted text page 305 further comprises a third ink object 1070 and a fourth ink object 1075 that correspond directly with the third ink object 1030 and the fourth ink object 1035 as discussed above. FIG. 10 illustrates an exemplary tree structure 1000 that can be accessed by the selection manager 280 in response to either the selection of electronic ink 320 or the selection of converted text 315. In other words, the selection manger 280 can access the exemplary architectural structure 1000 in order to highlight or indicate that the current word in an electronic ink section of the display device corresponds to another word in a converted text section and vice versa. In other words, upon selection of converted text 315, the selection manager 280 can use the exemplary hierarchical tree structure 1000 to find the corresponding address of the electronic ink that has been translated. The present invention is not limited to the exemplary data structure 1000 illustrated in FIG. 10. Those skilled in the art will appreciate that other ways exist to map selected text with corresponding electronic ink or electronic ink with corresponding electronic text.

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Figure 11:
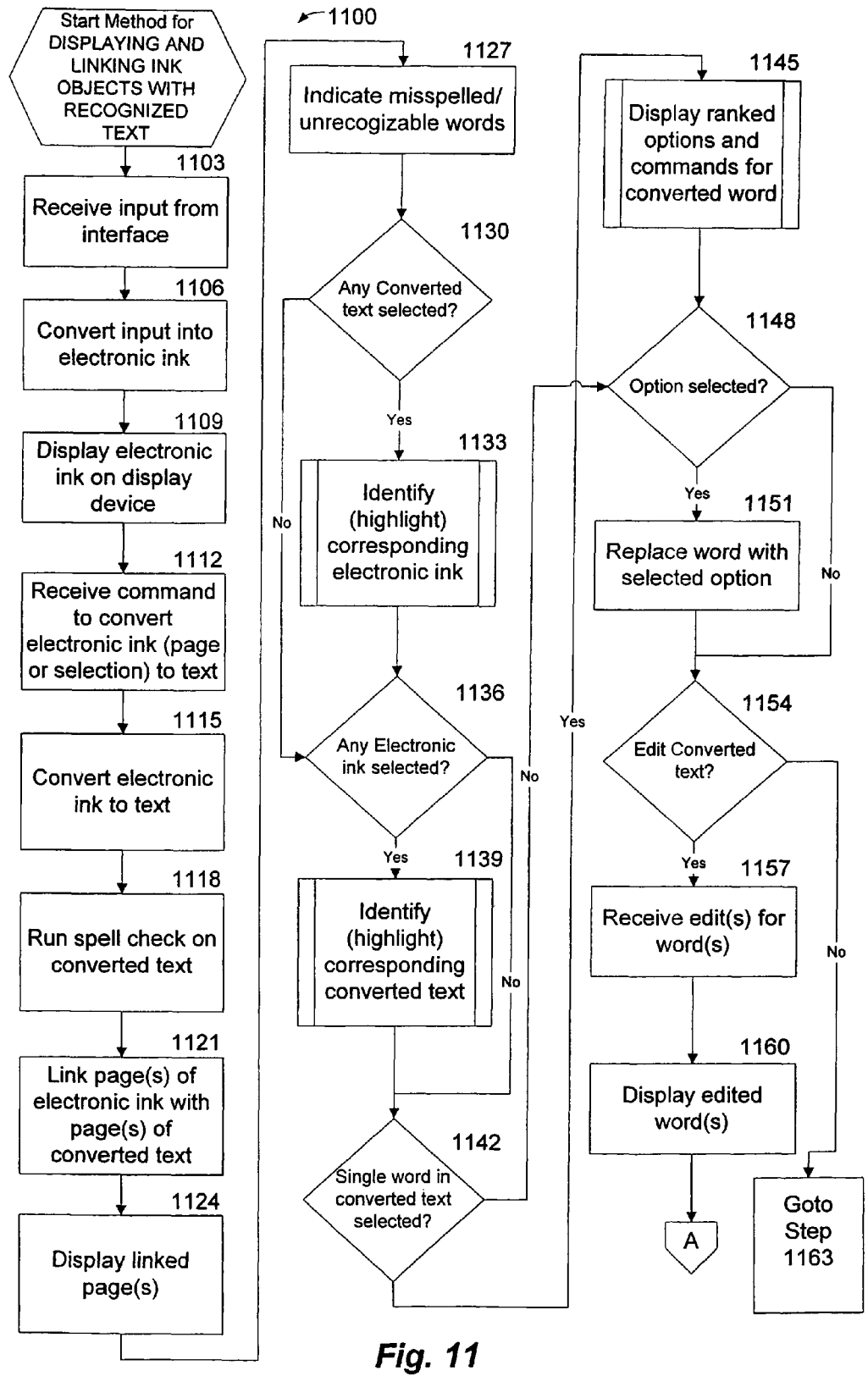
FIG. 11 is a logic flow diagram illustrating an overview of an exemplary process for displaying and linking creations with recognized text and objects according to one exemplary embodiment of the present invention.
Figure 12:
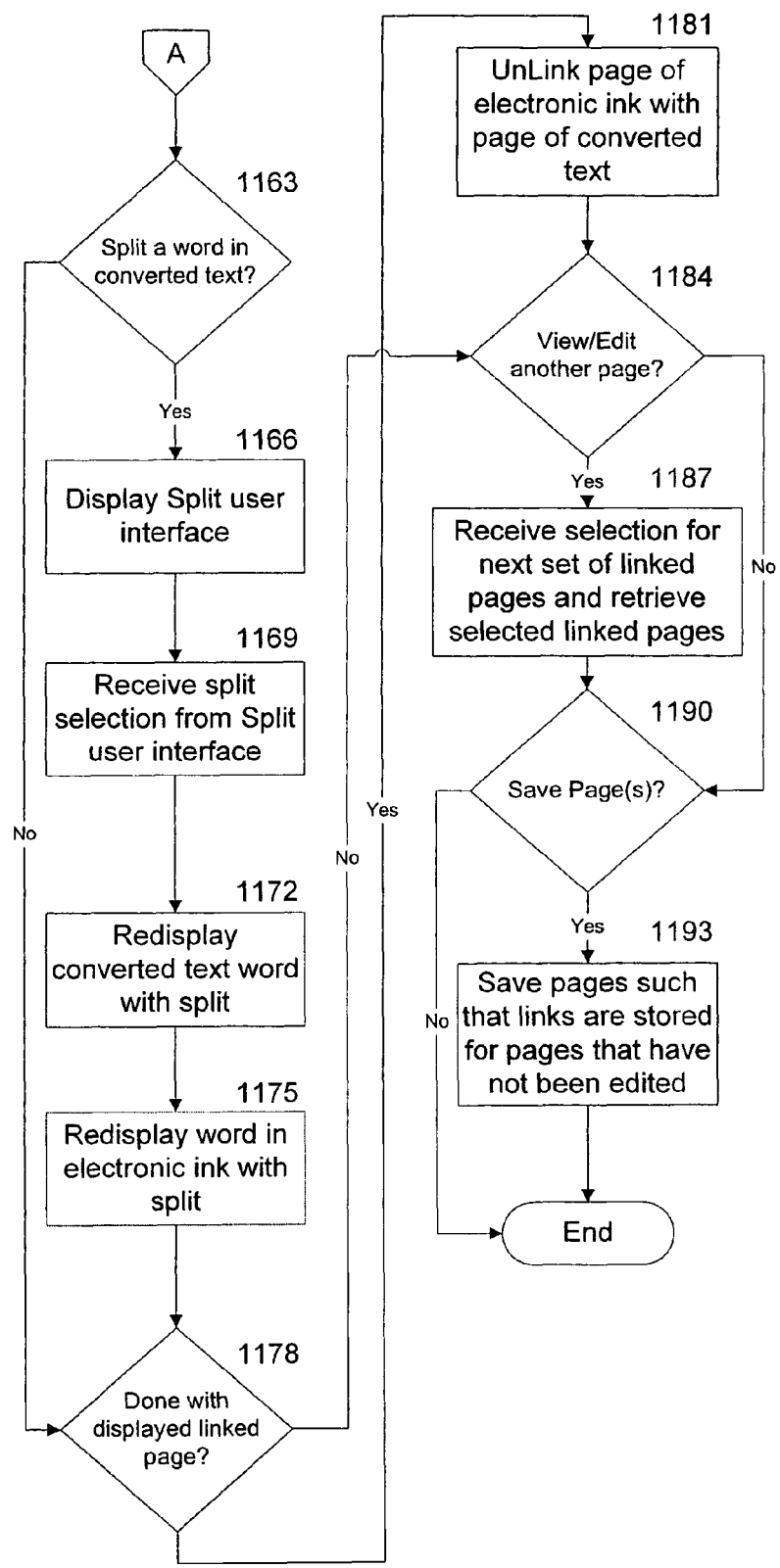
FIG. 12 is a logic flow diagram that is a continuation of logic flow diagram illustrated in FIG. 11 of the overview of the exemplary process according to one exemplary embodiment of the present invention.

Referring now to FIG. 11, this figure illustrates a logic flow diagram of an overview of an exemplary process for displaying and linking creations with recognized text and objects. The first step in the process 1100 is step 1103 in which input is received from an interface. For example, tablet 250 can receive input from a stylus 255.

Next, in step 1106, the input can be converted into electronic ink. For example, the ink generation commands received from the stylus 255 can be sent to the classifier module 215. The classifier module 215 confirms that the received commands are indeed ink and sends this information back to the document editing module/user interface 205. The document editing module 205 "dries" the ink by smoothing over the ink in accordance with mathematical smoothing equations known to those of ordinary skill in the art. After "drying" the electronic ink, the document editing module 205 finishes converting the electronic ink and sends it to tablet 250 or monitor 270 for display in accordance with step 1109.

In step 1112, a command is received to convert the electronic ink 320 to text. Next, in routine 1115, the electronic ink 320 is converted into text 315. The document editing module/user interface 205 sends the electronic ink to a word recognizer 235. The word recognizer 235 generates a list of alternates for each recognized electronic ink word. After generating a list of alternates for each word that is recognized from the electronic ink, the converted text is sent back to the document editing module 205. The document editing module 205 then forwards text to a rich edit module 275 which monitors and controls word wrapping and the selection of text. The document editing module 205 then forwards some of the information to the text input manager 295. The text input manager 295 then forwards the information to a user interface language input processor 297. The user interface language input processor 297 performs additional ink recognition and provides additional alternates for the recognized words.

After converting the electronic ink to text, in optional step 1118, the converted text is spell checked. However, it is noted that spell checking the converted text is not necessary and such a step can be skipped if desired. After the spell check of step 1118, in step 1121, pages of the electronic ink 320 are linked with pages of the converted text 315. The linked pages are then displayed on the display device such as the tablet 250 or monitor 270 and as illustrated in FIG. 3. In step 1127, misspelled or unrecognizable words are indicated on the display device such as the tablet 250 and the monitor 270. Next, in decision step 1130, it is determined whether any converted text 315 has been selected. The term "selection" or "selected" can mean marketing or identifying an object displayed on a display device for a later operation.

If the inquiry to decision step 1130 is positive, then the "yes" branch is followed to routine 1133 in which the corresponding electronic ink 320 is identified. Further details of routine 1133 will be discussed below with respect to FIG. 13. If the inquiry to decision step 1130 is negative, then the "no" branch is followed to decision step 1136.

In decision step 1136, it is determined whether any electronic ink 320 has been selected. If the inquiry to decision step 1136 is positive, then the "yes" branch is followed to routine 1139 in which the corresponding converted text 315 is identified. Further details of routine 1139 will be discussed below with respect to FIG. 13.

If the inquiry to decision step 1136 is negative, then the "no" branch is followed to decision step 1142. In decision step 1142, it is determined whether a single word in the converted text 315 has been selected for additional options. If the inquiry to decision step 1142 is positive, then the "yes" branch is followed to routine 1145 in which ranked options and commands for the selected converted word are displayed on menu 405. Further details of routine 1145 will be discussed below with respect to FIG. 14.

In decision step 1148, it is determined whether an option displayed in a drop-down menu 405 for a word has been selected. Specifically, the selection manager 280 can monitor if any options or commands are selected from menu 405. If the inquiry to decision step 1148 is positive, then the "yes" branch is followed to step 1151 in which the option selected is performed. For example, if a replacement word is selected from the ranked list 410 of alternate words, then the selected word is replaced with the selected option. If the inquiry to decision step 1148 is negative, then the "no" branch is followed to decision step 1154.

In decision step 1154, it is determined whether converted text has been edited. If the inquiry to decision step 1154 is positive, then the "yes" branch is followed to step 1157 in which edits are received and for one or more words. In step 1160, the edited word(s) are displayed.

If the inquiry to decision step 1154 is negative, then the "no" branch is followed to decision step 1163. In decision step 1163, it is determined whether a word in the converted text needs to be split or broken apart. If the inquiry to decision step 1163 is positive, then the "yes" branch is followed to step 1166 in which a split mechanism 505 is displayed on the display device 250 or 270. If the inquiry to decision step 1163 is negative, then the "no" branch is followed to decision step 1178.

In step 1169, a split selection is received from the split mechanism 505. Next, in step 1172, the converted text word is redisplayed with the split as illustrated in FIG. 6. In optional step 1175 (shown with dashed lines), the electronic ink word corresponding with the break or split apart word of the text is also split.

In decision step 1178, it is determined whether a user is completed or done with editing the currently displayed linked page. If the inquiry to decision step 1178 is positive, then the "yes" branch is followed to step 1181. If the inquiry to decision step 1178 is negative, then the process continues to decision step 1184.

If the inquiry to decision step 1178 is positive, then the "yes" branch is followed to step 1181 in which the electronic ink 320 is unlinked from the converted text 315 as illustrated in FIGS. 3-6.

If the inquiry to decision step 1184 is negative, then the "no" branch is followed to decision step 1190. If the inquiry to decision step 1184 is positive, then the "yes" branch is followed to step 1187 in which the selection for a next set of linked pages is received and the linked pages are also selected.

In decision step 1190, it is determined whether converted inked pages can be saved. If the inquiry to decision step 1190 is positive, then the "yes" branch is followed to step 1193 in which pages are linked and are shut down. In step 1193, the pages are saved such that the links are stored for pages that have not been editing.

Figures 13, 14:
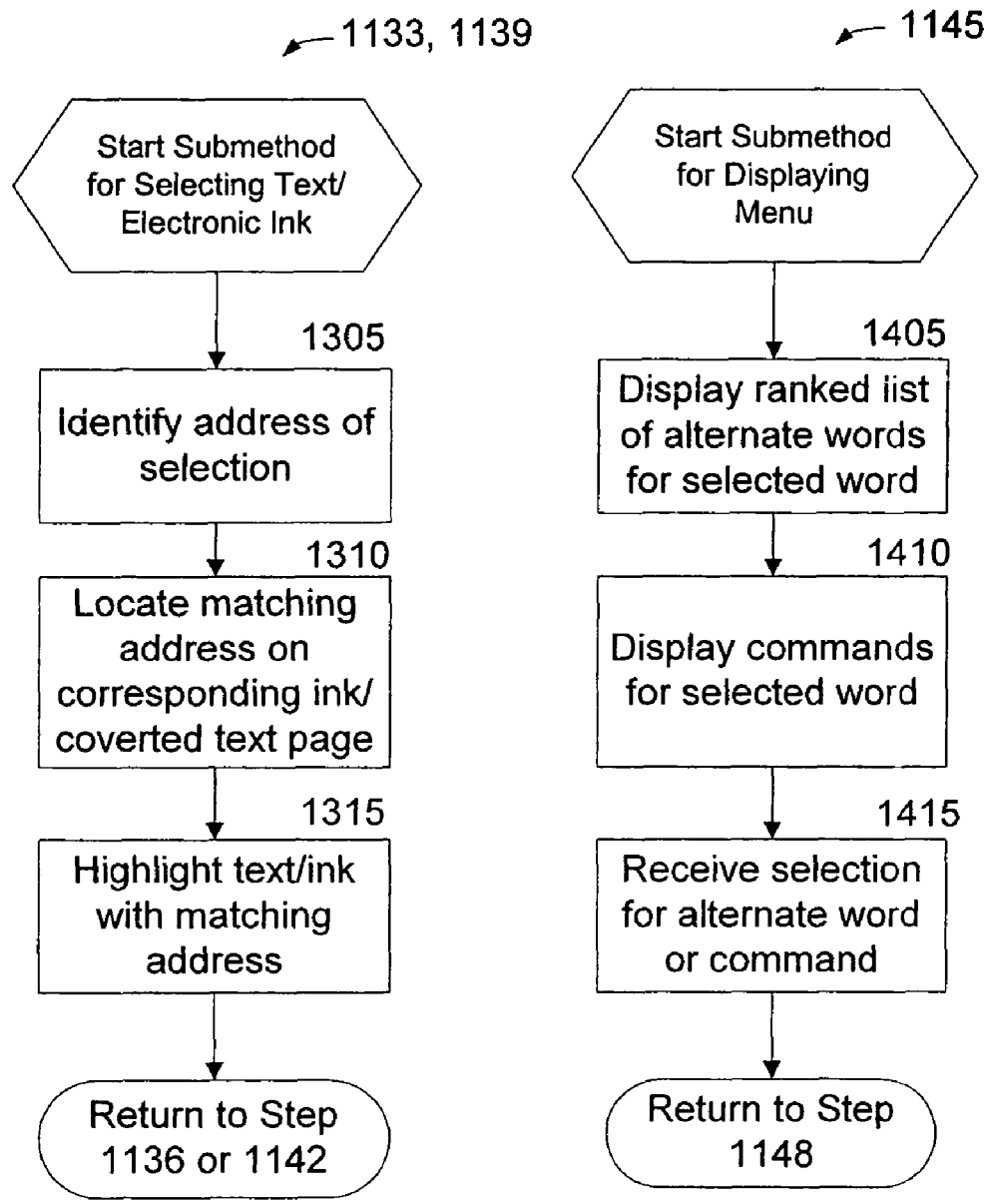
FIG. 13 is a logic flow diagram illustrating a submethod for identifying corresponding ink or corresponding text that is part of the logic flow diagram illustrated in FIG. 11 according to an exemplary embodiment of the present invention.
FIG. 14 is a logic flow diagram illustrating another submethod for displaying a menu comprising a ranked list of alternate words that is part of the logic flow diagram illustrated in FIG. 11 according to one exemplary embodiment of the present invention.

Referring now to FIG. 13, this figure illustrates a subprocess 1133, 1139 of FIG. 111 for identifying corresponding electronic ink or corresponding converted text. The sub-method or subprocess 1133, 1139 start with step 1305 in which the address of a selection is identified. This means that if converted text is selected, then the corresponding address of the selection is sent to the selection manager 280. Next, in step 1310, the selection manager 280 can locate the matching address on the corresponding converted text or electronic ink page. For example, referring back briefly to FIG. 10, if ink object 1015 were selected, then the corresponding text ink object 1050 would then be displayed.

Next, in step 1315, the corresponding ink or converted text is highlighted with the matching address. The process then returns back to either decision step 1136 or decision step 1142.

Referring now to FIG. 14, this figure illustrates a functional block diagram of the method 1145 that can produce the menu 405 as illustrated in FIG. 4. In step 1405, a ranked list of alternate words 410 that can be derived from context of use are displayed for the selected word. The monitoring of input relative to the alternate words can be performed by the context menu manager 285 as discussed above with respect to FIG. 2.

In step 1410, the selection manager 280 can display further commands 415, 420, 425, 430, 435, and 440 for the selected word. In step 1415, a selection for an alternate word or command can be received. The process then ends and returns to decision step 1148.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method for editing electronic ink documents, the method comprising:
   providing a group of pages that include electronic ink, wherein at least one page of the group of pages is linked to a corresponding page of text recognized from the electronic ink of the at least one page of the group of pages;
   receiving an edit completion command; and
   in response to receiving the edit completion command, causing a processor to unlink the corresponding page of text from the at least one page of the group of pages to facilitate storage of the corresponding page of text separate from the group of pages.

2. The method of claim 1, further comprising receiving a word selection in the at least one page prior to receiving the edit completion command, wherein the word selection in the at least one page causes a corresponding word selection in the corresponding page of text.

3. The method of claim 1, further comprising receiving a word selection in the corresponding page of text prior to receiving the edit completion command, wherein the word selection in the corresponding page of text causes a corresponding word selection in the at least one page.

4. The method of claim 1, further comprising receiving a highlight to a word in the at least one page prior to receiving the edit completion command, wherein the highlight in the at least one page causes a corresponding word highlight in the corresponding page of text.

5. The method of claim 1, further comprising, prior to receiving the edit completion command, displaying a menu having a list of options for editing a selected word.

6. The method of claim 5, wherein the list of options comprises one of changing a classification of electronic ink corresponding to a selected word in the page of text, adding a selected word to a dictionary, cutting a selected word from the page of text, copying a selected word from the page of text, and pasting another word over a selected word in the page of text.

7. The method of claim 1, further comprising, prior to receiving the edit completion command, defining a break point for a word and separating a word at the defined break point.

8. A computer-readable storage medium on a memory device having computer executable instructions for editing electronic ink documents, comprising:
   linking a page of text, recognized from a corresponding page of electronic ink, to the corresponding page of electronic ink within a group of pages of electronic ink;
   editing the page of text;
   receiving an edit complete command;
   in response to receiving the edit complete command, unlinking the edited page of text from the corresponding page of electronic ink within the group of pages of electronic ink; and
   saving the edited page of text separate from the corresponding page of electronic ink within the group of pages of electronic ink.

9. The computer-readable storage medium of claim 8, further comprising receiving a word selection in the corresponding page of electronic ink prior to receiving the edit complete command, wherein the word selection in the corresponding page of electronic ink causes a corresponding word selection in the page of text.

10. The computer-readable storage medium of claim 8, further comprising receiving a word selection in the page of text prior to receiving the edit complete command, wherein the word selection in the page of text causes a corresponding word selection in the corresponding page of electronic ink.

11. The computer-readable storage medium of claim 8, further comprising receiving a highlight to a word in the corresponding page of electronic ink prior to receiving the edit complete command, wherein the highlight in the corresponding page of electronic ink causes a corresponding word highlight in the page of text.

12. The computer-readable storage medium of claim 8, further comprising, prior to receiving the edit complete command, displaying a menu having a list of options for editing a selected word.

13. The computer-readable storage medium of claim 12, wherein the list of options comprises one of changing a classification of electronic ink corresponding to a selected word in the page of text, adding a selected word to a dictionary, cutting a selected word from the page of text, copying a selected word from the page of text, and pasting another word over a selected word in the page of text.

14. The computer-readable storage medium of claim 8, further comprising, prior to receiving the edit complete command, defining a break point for a word and separating a word at the defined break point.

15. A computer-implemented method for editing electronic ink documents, comprising:
   editing a page of text having a linked page of electronic ink of a group of pages of electronic ink;
   in response to receiving the edit complete command, causing a processor to unlink the edited page of text from the page of electronic ink of a group of pages of electronic ink; and
   saving the edited page of text separate from the page of electronic ink of the group of pages of electronic ink.

16. The method of claim 15, further comprising receiving a word selection in the corresponding page of electronic ink prior to receiving the edit complete command, wherein the word selection in the corresponding page of electronic ink causes a corresponding word selection in the page of text.

17. The method of claim 15, further comprising receiving a highlight to a word in the corresponding page of electronic ink prior to receiving the edit complete command, wherein the highlight in the corresponding page of electronic ink causes a corresponding word highlight in the page of text.

18. The method of claim 15, further comprising, prior to receiving the edit complete command, displaying a menu having a list of options for editing a selected word.

19. The method of claim 18, wherein the list of options comprises one of changing a classification of electronic ink corresponding to a selected word in the page of text, adding a selected word to a dictionary, cutting a selected word from the page of text, copying a selected word from the page of text, and pasting another word over a selected word in the page of text.

20. The method of claim 15, further comprising, prior to receiving the edit complete command, defining a break point for a word and separating a word at the defined break point.

21. The method of claim 15, further comprising receiving a word selection in the page of text prior to receiving the edit complete command, wherein the word selection in the page of text causes a corresponding word selection in the corresponding page of electronic ink.

\* \* \* \* \*